United States Patent

[11] 3,566,231

| [72] | Inventor | Frederick R. Pfeiffer |
| | | Shoreview, Minn. |
| [21] | Appl. No. | 798,036 |
| [22] | Filed | Feb. 10, 1969 |
| [45] | Patented | Feb. 23, 1971 |
| [73] | Assignee | Honeywell Inc. |
| | | Minneapolis, Minn. |

[54] SERVOMECHANISM CONTROL APPARATUS
11 Claims, 7 Drawing Figs.

[52] U.S. Cl. ............................................. 318/681,
318/227, 318/683
[51] Int. Cl. ............................................. G05f 1/08
[50] Field of Search .................................. 318/835,
20.388, 171, 227, 20.850, 20.845

[56] References Cited
UNITED STATES PATENTS

| 3,089,992 | 5/1963 | Seney..................... | 318/171 |
| 3,355,647 | 11/1967 | Braus..................... | 318/227X |
| 3,369,160 | 2/1968 | Koppel et al............. | 318/28X |
| 3,471,759 | 10/1969 | Broverman............... | 318/448X |
| 3,355,640 | 11/1967 | Lewis et al............... | 318/18 |

Primary Examiner—B. Dobeck
Attorneys—Charles J. Ungemach, Ronald T. Reiling and Gordon Reed ABSTRACT: A closed loop servosystem includes an AC electric motor that is connected to an external AC power source for reversible rotation. The phase angle of energization of the motor during a half-cycle of the power source is a nonlinear function of the magnitude of the error signal in the closed loop system. The connection of the power source with the motor is effected by a switching arrangement that varies the period of motor energization in each of the AC power source half-cycles so that the magnitude of torque of the motor is substantially linear with the magnitude of the error signal in the system. The phase angle control or the controlling of the period of energization of the motor in each half-cycle of the power source voltage is such that the torque of the motor relative to the error signal approaches linearity whereas the relationship between the error signal and the phase angle of energization is nonlinear. The switching arrangement provides a unique switching signal that comprises the closed loop error signal and a second signal derived from manipulation of the line voltage obtained from the external AC power source for the motor. In the present arrangement, such second signal is a demodulated quadrature signal of the AC power source to provide desirable nonlinearity between the error signal and phase angle of energization of the motor.

INVENTOR.
FREDERICK R. PFEIFFER

BY *Gordon Reed*

ATTORNEY

INVENTOR.
FREDERICK R. PFEIFFER
ATTORNEY 3,566,231

SERVOMECHANISM CONTROL APPARATUS

SUMMARY OF THE INVENTION

In control apparatus, a closed loop servosystem is often used. This closed loop servosystem senses the departure of the apparatus from a desired condition and causes operation of the servosystem through an initiating signal. The operation of the motor also produces a feedback signal which is opposed to the initiating signal and the servosystem is at rest when there is no difference between the initiating and the feedback signal. Any difference between the signals is termed an "error signal" which controls the energization of the motor.

Where an AC motor is connected to an external power source, such as in relay control of AC motors where such relay may be a silicon controlled rectifier, the duration of energization of the motor in each half cycle of the power source may be made proportional to the magnitude of the error signal. While the period of energization in each half cycle may be made proportional to the magnitude of the error signal, yet, due to the shape of the AC waveform, the area under the power curve for one magnitude of error signal is less than half of the area under the curve for a signal with a magnitude twice as great. In other words, if the firing angle of the AC power source is actually a linear function of the magnitude of the error signal, then on comparison of such areas there is a low gain at small firing angles. This results in a pronounced nonlinearity of operation in the servoloop in that the motor torque is not linearly proportional to the error signal. In the present arrangement, an approach to linearity between magnitude of error signal and magnitude of resulting motor torque is obtained by providing a nonlinear relationship between the phase angles for different error signals so that for small error signals a greater proportional phase angle of energization is provided.

Thus, in brief, the object of the invention is to more closely approach linearity between an error signal and the average torque of a motor resulting from such error signal thereby reducing the threshold of motor operation and therefore the "dead spot" in the system.

The above and other objects of the invention and the invention itself, both as to its organization and method of operation as well as additional objects and advantages thereof, will thus be understood from the following description when read in connection with the accompanying drawings, in which.

Figure 5A:
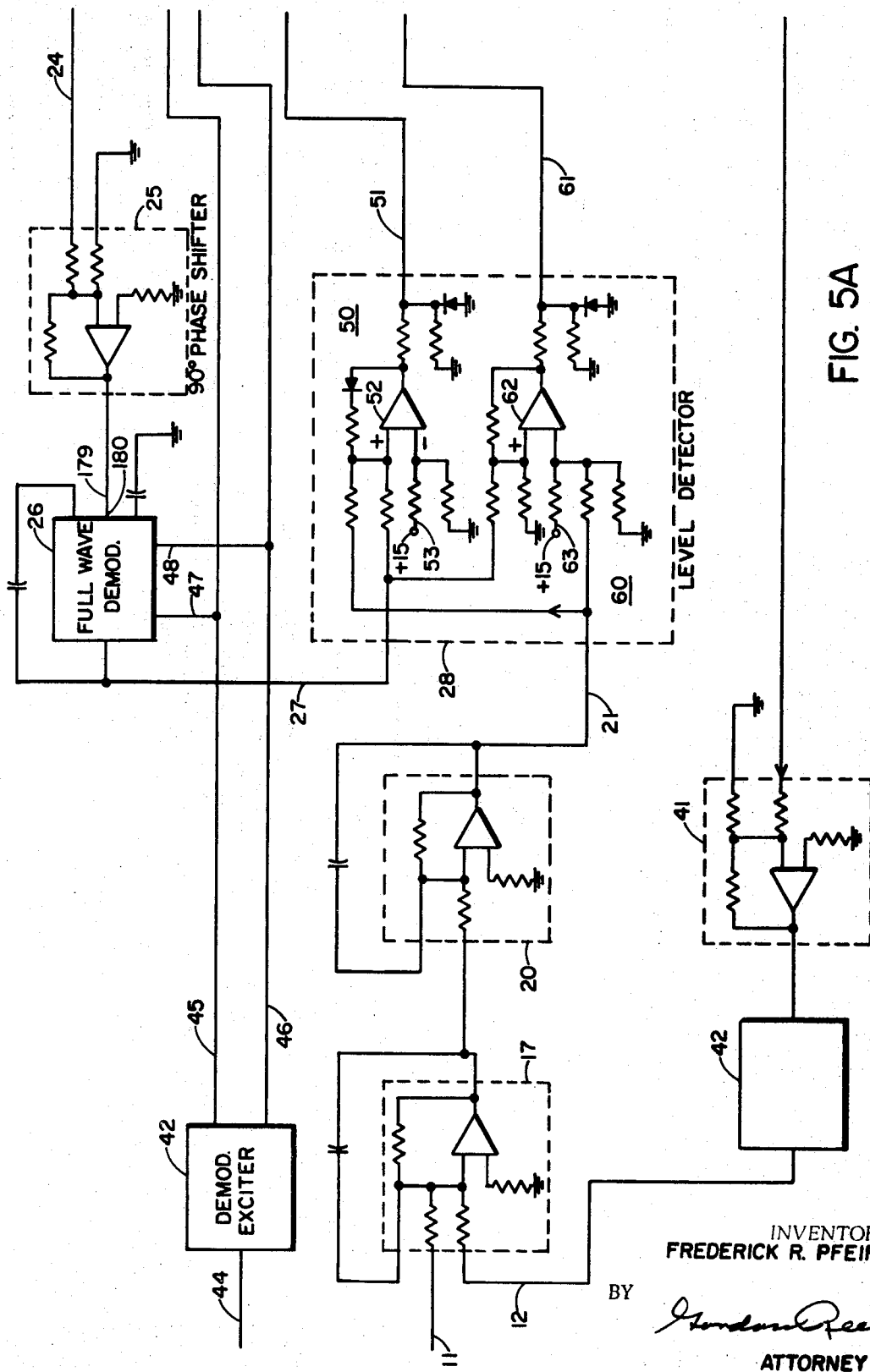
Figure 5B:
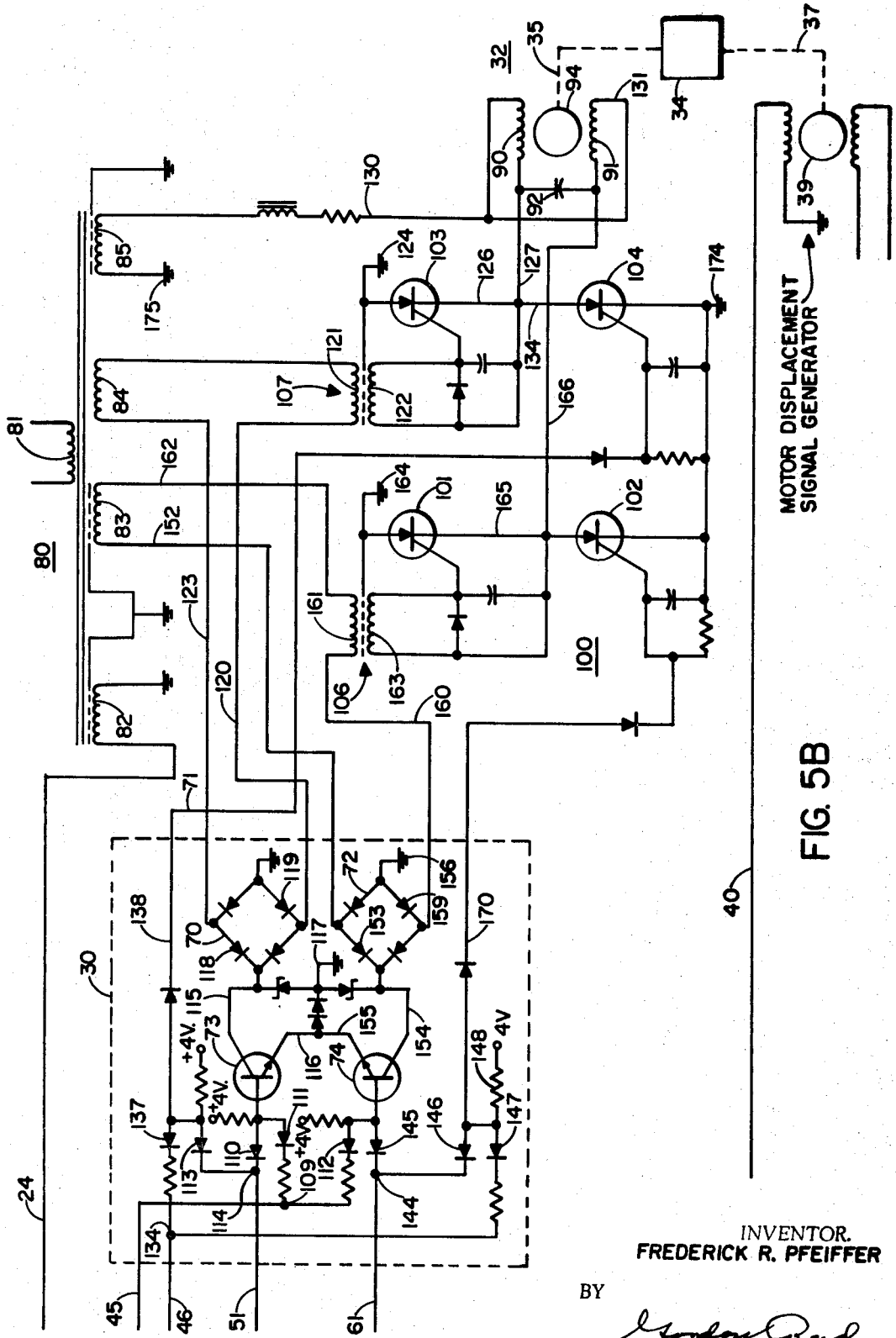
Figure 6:
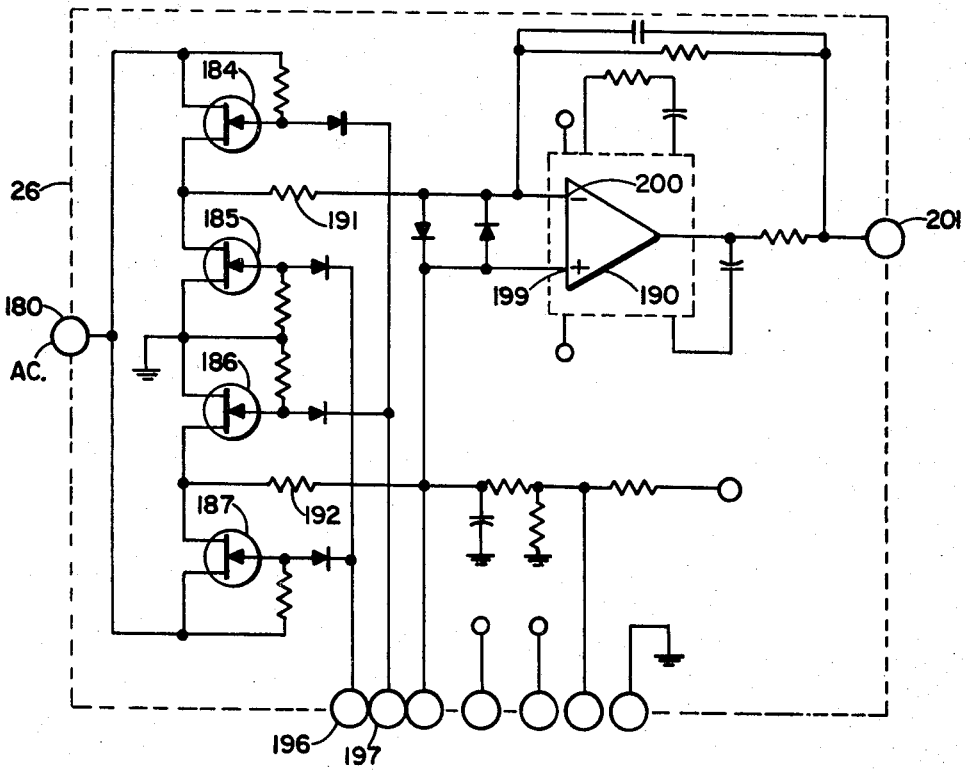

FIGS. 5A, 5B jointly show an electrical schematic of the novel control arrangement for a servomotor; and FIG. 6 is a schematic of the demodulator-amplifier of FIG. 5A.

DETAILED DESCRIPTION

Figure 1:
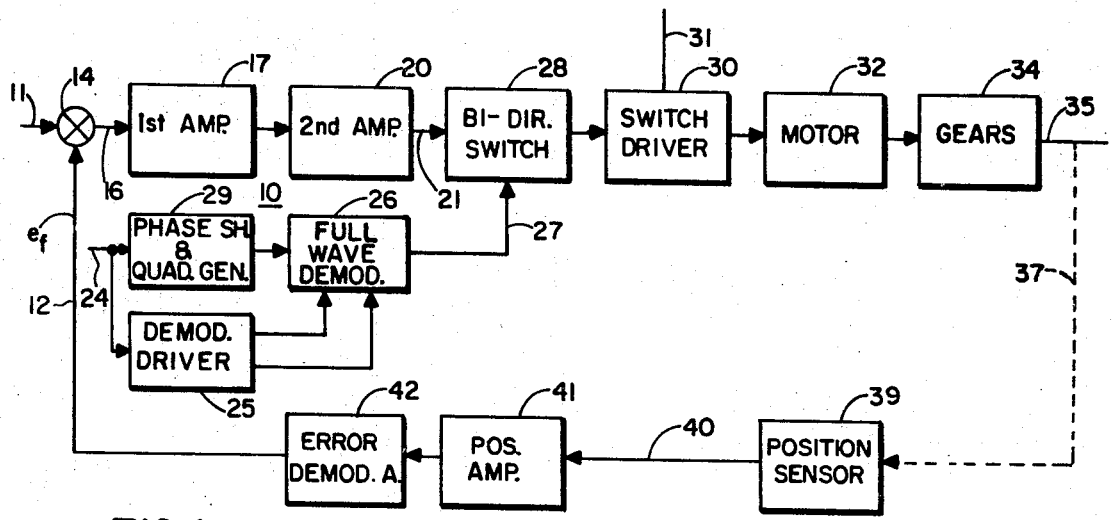
FIG. 1 is a block diagram of the closed loop control system.

In FIG. 1, a closed loop servocontrol system, or servomechanism 10 receives an initiating signal over conductor 11. This initiating signal may be obtained from a condition sensor such as one measuring attitude error of an aircraft. This signal on conductor 11 is supplied to a summing device 14. A second or rebalancing signal on conductor 12 is also supplied to a summing device 14. The second signal may be termed a "feedback signal" and opposes the initiating signal. The difference, between the signals applied to summing device 14, termed a system error signal, is supplied over conductor 16 to a first amplifier 17, thence to a second amplifier 20 with the amplified output of the error signal therefrom appearing on conductor 21. Since closed loop systems are old, the invention is primarily in controlling a motor from an error signal having various magnitudes. The output or error signal as amplified is applied to a bidirectional switch 28 for control thereof. Bidirectional switch 28 also receives, for control purposes, a second electrical control signal. Such second signal is supplied from an AC voltage source through a conductor 24 connected to the AC voltage source, a demodulator driver 25 having its output supplied to a toggle demodulator amplifier 26, with the output of toggle demodulator 26 supplied via conductor 27 to the bidirectional switch 28.

The bidirectional switch controls a switch driver 30. Driver 30 is connected through electrical power transmission means 31 to an external AC power source. This AC power source may be the same as that connected to electrical conductor 24 so that the same frequency and phase of AC voltage is supplied to conductor 24 and conductor 31. Switch driver 30 supplies AC power to the motor 32 in accordance with the control applied to the switch driver from the bidirectional switch 28. Motor 32 through suitable motor gears 34 has its mechanical output supplied via mechanical transmission means 35 to a condition control device such as a control surface of an aircraft to restore the condition. The operation of the transmission means 35 for a closed loop system is supplied through a subtransmission means 37 to operate a servoposition sensor or position feedback generator 39 which supplies an output over transmission means 40, position signal amplifier 41, demodulator 42 to the feedback conductor 12.

Since apparatus for controlling a motor from an external power source, such as in relay control of servomotors is broadly old, the primary novelty here is in the control of the switch driver 30 from the bidirectional switch 28 which in turn is controlled by an error signal on conductor 21 and the information or indication on conductor 27. Thus while the energization of a motor from an external power source, rather than having it energized from the output of an amplifier, has been heretofor accomplished, as has the energization of a motor from an external power source through relay contacts with AC power from an external source, a novel arrangement for motor energization is here provided.

Figure 2:
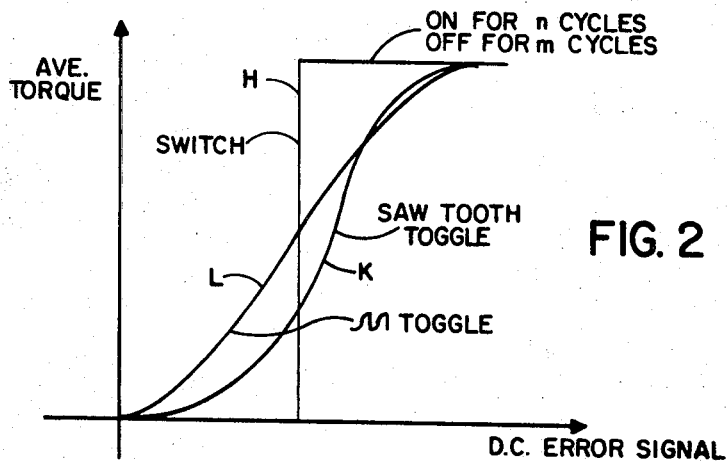
FIG. 2 is a diagram showing curves of motor torque compared with error signal for various forms of control including the subject arrangement.

FIG. 2 diagrammatically shows the relationship between the magnitude of an error signal, in a closed loop system, for example, and the average torque of the servomotor of such system using different forms of control. Curve H therein illustrates what is known as an "on-off" system wherein AC power may be applied to the motor for $n$ cycles and then the power may be off for $m$ cycles. Curve H indicates that a considerable threshold of initiation of motor operation must be overcome by the magnitude of the error signal before motor operation begins.

Curve K shows a performance curve for what may be considered phase control of an AC motor similar to that described in a General Electric publication, SCR Manual, Third Edition, beginning page 125, relating to "Principle of Phase Control." Note that in the error signal-torque curve K, there is a low gain or very little torque for small error signals as represented by the curve being concave upwardly in this region. Thus while the motor may be energized under control of the signal during each half wave of the power curve from the AC source, there is considerable nonlinearity between the motor torque and the magnitude of error signal of the servo system.

Curve L represents the improved performance with respect to magnitude of error signal and motor torque as derived from applicant's arrangement. In curve L when an error signal exists there is energization of the motor from the AC power source in each half-wave of the voltage from the power source. Although curve L is not exactly linear in the relationship of magnitude of error signal and motor torque, it is evidently an improvement in the operation represented thereby over that obtained in curve K. Thus, with respect to curves K and L, if considerable torque is required to overcome a threshold of operation in the servosystem, it is evident that a smaller magnitude of signal to overcome such threshold of operation would be effective in the system operating in accordance with curve L than would be the case were it to operate in accordance with curve K.

Figure 3:
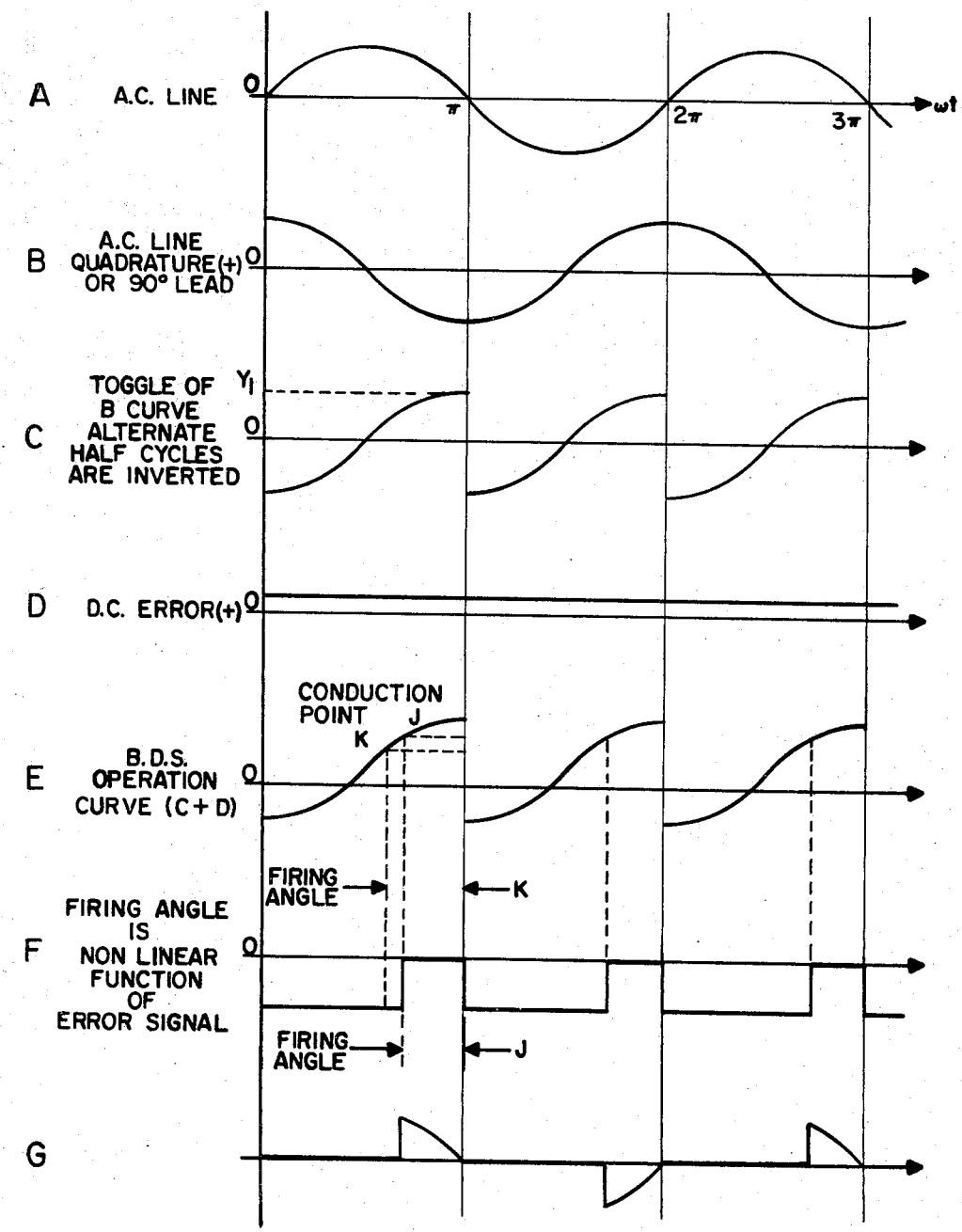
FIG. 3 is a set of individual waveform diagrams, all related, pertaining to the present mode of energization of a servomotor.

FIG. 3 illustrates in sequence by waveforms A—F the control ultimately obtained by which the motor 32 of FIG. 1 is controlled from the external AC power source connected to transmission means 31 through switch driver 30. Curve A represents the waveform of the AC line voltage obtained from the external power source. Curve B illustrates the AC line voltage of curve A with a 90° phase shift or 90° lead. Thus curve B may be considered a quadrature of the waveform in curve A. In curve C, a "toggle" effect has been applied to the wave form in curve B so that alternate half-cycles thereof are inverted or displaced 180° along the X axis. Referring to curve C, the magnitude of ordinate O—$Y_1$ represents the trip level of the bidirectional switch 28 of FIG. 1. In other words, for this bidirectional switch to have an output, the input thereto must exceed the magnitude O—$Y_1$. Curve D shows a horizontal line above the X axis and it represents an assumed magnitude of the DC error signal, positive in this case, in the servosystem and present on conductor 21 in FIG. 1. Curve E shows the combining of the ordinates of curves C and D, which for the positive DC error signal in D merely represents an upward shift of curve C in accordance with the error signal magnitude. Thus by the combination of the two signals, the point J on curve E is slightly above the trip level of bidirectional switch 28 of FIG. 1, and switch 28 supplies an output of rectangular waveform having a duty cycle or firing angle duration in curve F as indicated. Referring again to curve E, it is evident that if the error signal magnitude in curve D be twice as great as represented by the increased vertical shift of C in curve E, that point K on curve E will be at the trip level of the bidirectional switch 28 of FIG. 1 and cause a rectangular wave output from switch 28 of increased duty cycle. Of significance, however, is that while the firing angle in F with point K at the trip level, is longer than the firing angle with point J at the trip level, it is evident that while one DC error signal is twice as great as the other, its firing angle in F is not twice as great. In other words, the output of the bidirectional switch 28, with respect to length of firing angle, is not twice as great in one case than in another even though its error signal in the one case may be twice as great as in the other case. In other words, curve C is so shaped that there is a resulting nonlinearity between the magnitude of the error signal and the firing angle of the bidirectional switch, that is the ratio of error signal to firing angle is not a constant or is not linear.

Such nonlinear relationship between error signal and firing angle of this invention may be compared to conventional methods employing a sawtooth shaped toggle signal as per General Electric publication, SCR Manual, Third Edition, relating to "Principle of Phase Control" above. In the sawtooth method the firing angle varies linearly with error signal; however, the motor torque is primarily a function of the fundamental frequency component of applied voltage, which is a pronounced nonlinear function of firing angle shown in curve G, FIG. 3. By contrast, this invention produces a relationship between firing angle and error signal which is nonlinear and furthermore this relationship is such that the end result becomes a nearly linear relationship between error signal and motor torque. Thus, by providing a nonlinear relationship between error signal and firing angle as in curve F, the ratio of error signal to power supplied to the motor is more nearly made a constant, as represented by curve G in FIG. 3.

Figure 4:
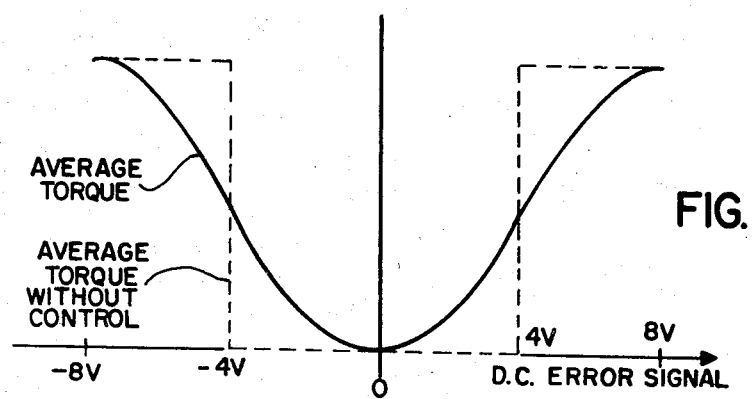
FIG. 4 is a diagram showing the relationship between motor torque and the applied error signal for positive or negative polarities provided by the present invention.

FIG. 4 shows the relationship between motor stall torque and positive and negative polarities of the error signal input in volts, for applicant's invention. Also, FIG. 4 shows for comparison in broken lines an on-off form of control wherein the extent of dead spot (8 volts as shown) is provided. Such dead spot magnitude represents a designer's compromise between desired closed loop servo stability (avoidance of oscillation about zero) and dead spot (sensitivity of the amplifier of the system). Thus, for on-off control, shown in the broken lines as the error signal increases, it ultimately attains a magnitude of 4 volts at which time the full torque is provided by the motor. This may be considered a form of operation giving an extreme nonlinearity between magnitude of error signal of the system and motor stall torque. In curve shown herein as in curve L in FIG. 2, a linear relationship between system error signal and motor stall torque is approached thereby clearly illustrating the advantage of applicant's arrangement.

A mechanization or a schematic showing to obtain an operation of error signal and motor torque as shown in the solid curve of FIG. 4 is illustrated in FIGS. 5A, 5B. In FIG. 5A, a condition sensor such as a position or displacement gyro (not shown) provides a signal on conductor 11 in accordance with the changes in the condition from a desired magnitude. Such condition error signal on conductor 11 is supplied to a summing amplifier 17. Also applied to amplifier 17 is a servoposition feedback signal from conductor 12. The output of amplifier 17 is thus in accordance with the servosystem error signal which system error signal is in accordance with the difference between the voltage on conductor 11 and that on conductor 12. This servosystem error as amplified is supplied to a second summing amplifier 20 with the output of the amplifier 20 being a DC signal of positive or negative polarity but it is a continuous or analogue signal. Conductor 21 transmits the output of amplifier 20 to a bidirectional switch 28. A variable bias signal is applied to the bidirectional switch through a conductor 27 extending from a full wave demodulator-amplifier 26. The electrical bias signal on conductor 27 and the servosystem electrical error signal on conductor 21 are combined to control the output of the bidirectional switch 28 as illustrated in curve F, FIG. 3.

The demodulator-amplifier 26 is supplied with three voltage inputs. To supply one input voltage, a conductor 24 extending from an alternating voltage source supplying similar voltage for control of a motor 32 is connected to a phase shifter 25. The output of phase shifter 25 is an alternating voltage which is shifted 90° in advance of the voltage on conductor 24. The output of the phase shifter 25 is supplied to demodulator-amplifier 26. The second and third control inputs are square waves, one 180° out of phase with the other, and are supplied through a demodulator-exciter 42 from a conductor 44 connected to a source of alternating voltage similar to that energizing conductor 24. The square wave outputs of demodulator-exciter 42 have positive and negative magnitudes and appear on conductors 45, 46. The output on conductor 45 is a square wave of alternate positive and negative polarity whereas the output on conductor 46 is a square wave of negative and positive magnitudes or having the opposite polarity from that on conductor 45. A subconductor 47 extends from conductor 45 to the demodulator-amplifier 26 and a subconductor 48 extends from conductor 46 to the demodulator-amplifier 26. The details of the demodulator-amplifier 26 will be hereinafter considered and for the present it is noted that the output on conductor 27 is similar to that shown in curve C, FIG. 3. Thus, it is a varying bias signal, varying from a maximum negative valve to a maximum positive value. Thus, one portion of the curve is concave upward and another portion is concave downward.

The bidirectional switch 28 comprises two sections. One section 50 applies a motor control output to conductor 51 for operating the motor 32 in one direction; the other section 60 applies its output to conductor 61 to control rotation of motor 32 in the opposite direction. In FIG. 5A, the amplified closed loop system DC error voltage on conductor 21 is supplied in one case to the positive terminal of an amplifier 52 in section 50 and also to a negative terminal of an amplifier 62 in section 60 of the bidirectional switch 28. Also, a +15 volt DC bias on conductor 53 is supplied to the negative terminal of amplifier 52 and similarly a +15 volt DC bias on conductor 63 is applied to the negative terminal of amplifier 62. The bias voltages are to supply a trip level for amplifiers 52, 62. Section 50 operates from positive DC error signals, thus may be called the plus section. Section 60 operates from negative error signals and is thus the minus section.

Therefore, conductors 21 and 27 are both connected to the positive terminal of amplifier 52. However, in section 60, the servosystem error signal on conductor 21 is applied to the negative terminal of amplifier 62. With respect to section 50, the output on conductor 51 is a positive DC voltage if the composite input of the error voltage on 21 and the varying voltage on conductor 27 is greater than the +15 bias voltage on conductor 53. With respect to the output from section 60, termed the minus section, the output on conductor 61 is a positive DC voltage if the error signal on conductor 21 is negative since it is applied to the negative input terminal of amplifier 62. Thus, it is evident when looking at amplifier 52, that with a positive DC error signal on conductor 21 combined additively with a positive voltage on conductor 27, that if the combined voltage exceeds the +15 bias voltage on conductor 53 (that opposes the combined voltage) a rectangular wave of alternate positive and negative values will appear on conductor 51 causing rotation of motor 32. However, as to section 50, if there is a negative system DC error voltage on conductor 21, this negative voltage as applied to section 50 is therefore subtracted from say the maximum positive voltage on conductor 27 and the resultant voltage will not exceed the +15 bias voltage on conductor 53 in the negative section of amplifier 52. Consequently, there will not be a square wave output from section 50.

On the other hand, in section 60, amplifier 62 receives at its negative control terminal a +15 bias voltage but also receives the negative system error voltage from conductor 21 consequently, the negative error signal on the negative control terminal assists a positive voltage on conductor 27 on the positive amplifier terminal, the effect thus may exceed the +15 bias voltage on conductor 63 for the negative control terminal of amplifier 62. Thus conductor 61 will have an alternate positive negative rectangular wave output for negative error signals to effect opposite rotation of motor 32.

We thus see that by reference to curve E of FIG. 3 that for small DC error signals in the closed loop motor control system, either of positive or negative magnitudes, a rectangular wave voltage appears either on conductor 51 or 61. The width of the wave depends on the magnitude of the error signal. Thus the bidirectional switch controls forward or reverse direction of rotation of motor 32 depending upon the polarity of the error signal. With no error signal, switch 28 has no output. It may also be stated as to terminology that bidirectional switch 28 may be termed a level detector, such as a Schmidt trigger.

Although the bidirectional switch 28 through its outputs on conductors 51 or 61 could directly control switching devices for supplying energization to motor 32, it is preferred that the bidirectional switch 28 effect such motor control through a driver 30, FIG. 5B, which may be termed a switch driver. Switch driver 30 comprises a pair of diode bridges 70, 72, transistors 73, 74, and other elements. The switch driver receives control input voltages from conductors 45, 46, from the demodulator-exciter 42 and also receives control signals from the conductors 51, 61 extending from the bidirectional switch 28.

Leaving the switch driver 30 for the time being, the system also includes a power source transformer 80 having a primary winding 81 energized from an AC source and four secondary windings 82, 83, 84 and 85.

Motor 32 is of the two phase induction type having windings 90, 91, phasing capacitor 92 and rotor 94. The operation of motor 32 is applied through shaft 35, gear train 34 to the motor displacement followup signal generator 39. The energization of the windings of the motor 32 is effected through the operation of a switching arrangement 100 comprising silicon controlled rectifiers 101, 102, 103, 104, transformers 106, 107 along with suitable circuitry, the operation whereof will be described from a systems aspect. However, one pair of the silicon controlled rectifiers controls operation of motor 32 in one direction and the other pair of silicon controlled rectifiers controls operation of the motor in the opposite direction. For either operation, the pair of silicon control rectifiers involved provides energization of the motor 32 in each half-wave of the AC power supplied to primary winding 81 of transformer 80.

In FIG. 6, the demodulator-amplifier 26 is shown in detail. In the present arrangement, device 26 is what is known as a transformerless demodulator amplifier for inverting alternate half-cycles of an input voltage. The demodulator-amplifier includes field effect transistors (FET) 184, 185, 186, 187 which are arranged as switches and are "on" for positive voltage drive and "off" for negative voltage drive to them. The device includes an amplifier 190 which may be an operational amplifier and a differential amplifier having two input terminals 199, 200 and an output terminal 201 with one of the input terminals being an inverting terminal.

One input to the demodulator-amplifier 26 is supplied to terminal 180 of the device from a conductor 179 extending to terminal 180 from phase shifting device 25, FIG. 5A. The demodulator-amplifier device 26 also includes an input terminal 196 connected to conductor 47 and a third input terminal 197 to which is connected conductor 48, FIG. 5A, whereby terminals 196 and 197 are supplied with square wave input signals, one of which is 180° displaced from the other.

Assuming a positive square wave from demodulator-exciter 42 is applied to terminal 196, a positive input is supplied to FET 185 and 187. Since a negative input is supplied to FET 184 and 186 they are now "off." The AC input to terminal 180 is now supplied through FET 187 and thence to terminal 199 which is the noninverting terminal of amplifier 190. At this time, with FET 185 also turned "on" a conduction path is provided from differential amplifier terminal 200 to signal ground to thereby provide a low impedance bias path for amplifier 190 when FET 184 and 186 are "off."

In the next half-cycle, a positive voltage is applied to the other terminal 197 whereby FET 184 and 186 are turned "on" whereas the negative input to FET 185 and 187 turns them "off." The AC signal applied to terminal 180 from conductor 179 passes through the "on" FET 184 and to the inverting amplifier input terminal 200 of amplifier 190 so that the output at terminal 201 of device 26 is an inversion of the input applied to terminal 180.

OPERATION

As a preliminary, from demodulator-exciter 42, FIG. 5A, there will be alternate positive and negative square waves applied to conductors 45, 46 so phased that when the square wave on conductor 45 is positive that on conductor 46 is negative. Demodulator 26 will supply to conductor 27 an electrical output as shown in FIG. 3, curve C which will be combined with the electrical error or input signal on conductor 21 and applied to the bidirectional switch 28. If it be assumed that the error signal voltage on conductor 21 is positive and that the voltage output on conductor 51 from the bidirectional switch 28 is consequently positive and assuming also that the conductor 45 at the moment has a positive square wave, the voltage on conductor 45 is applied to a terminal 109 of a first AND gate comprising diodes 110, 111 forwardly biased through a resistor from a +4.3 volt supply. Also the voltage on conductor 51 is applied to a conductor terminal 114 which in turn is connected to the first AND gate mentioned to back bias diode 110 and is also connected to a second AND gate comprising diodes 113, 137 which are forwardly biased from a +4.3 volt supply. Consequently, in the first AND gate, the +4.3 volt supply is applied to the base of NPN transistor 73 causing conduction therein with such conduction completing a circuit from secondary winding 84, conductor 123, diode 118 of diode bridge 70, conductor 115, transistor 73, conductor 116, conductor 117 to ground, then ground of diode bridge 70, diode 119, conductor 120, primary winding 121 of transformer 107 and return to secondary winding 84. The energization of primary winding 121 results in the energization of secondary winding 122 resulting in the application of a control signal to SCR 103 causing conduction therein and thus completing a circuit from secondary winding 85, ground terminal 175, ground conductor 124, SCR 103, conductor 126, conductor 127, motor winding 90, return conductor 130 to secondary winding 85 and also completing a parallel circuit from conductor 127, capacitor 92, motor winding 91, conductor 131, conductor 130 to secondary winding 85. The energization of the motor windings 90, 91 results in a rotation of motor rotor 94 in one direction.

During the second half-wave of the AC cycle applied to primary winding 81 of transformer 80, conductor 46 is now positive and conductor 45 is negative but conductor 51 is still positive. The voltage on conductor 46 is applied to terminal 134 of switch driver 30 and thus to the second AND gate comprising diodes 113 and 137 whereby diodes 137 and 113 are back biased from the positive voltages on conductors 46, 51 resulting in the application to conductor 138 of a plus voltage from a +4.3 volt supply to apply a control signal from conductor 71 to the control element of SCR 104 resulting in conduction therethrough from transformer winding 85, conductor 130, motor winding 90, conductor 127, conductor 134, SCR 104, to ground terminal 174 and return to ground of transformer winding 85. A parallel circuit extends from conductor 130, conductor 131, motor winding 91, capacitor 92, conductor 127, conductor 134, SCR 104, to ground terminal 174 and return to ground terminal of transformer winding 85.

Similarly, when the DC error signal on conductor 21 is negative, the output on conductor 61 is positive with substantially zero output on conductor 51. Thus, with conductors 45 and 46 alternatively positive and negative and with conductor 61 positive, the voltage on conductor 61 is applied to a terminal 144 of switch driver 30 which is electrically in common to a third AND gate having diodes 112, 145 and fourth AND gate having diodes 146, 147. The voltage on conductor 45 is applied to terminal 109 and thus also to the third AND gate whereby diodes 112 and 145 are back biased resulting in an application to the base of NPN transistor 74 of a +4.3 volt control signal causing conduction in transistor 74 completing a circuit from secondary winding 83, conductor 152, diode 153 of diode bridge 72, conductor 154, transistor 74, conductor 155, conductor 117 to ground and to ground terminal 156, diode 159, conductor 160, primary winding 161 of transformer 106, conductor 162 to secondary winding 83. With the energization of primary 161, secondary winding 163 is energized applying an energizing control signal to SCR 101 completing a motor energizing circuit from transformer winding 85, to ground terminal 175, to ground terminal 164, SCR 101, conductor 165, conductor 166, motor winding 91, conductor 131, conductor 130, to winding 85, thus causing energization of the motor to effect reverse or opposite rotation thereof as provided by SCR 103. A parallel circuit is also provided through motor winding 90 and capacitor 92.

In the next half-cycle when conductor 46 is positive and conductor 45 is negative, the positive voltage on conductor 46 applies a back bias to diode 147 and the positive voltage on conductor 61 applies a back bias to diode 146 resulting in the application from a 4.3 volt source 149 through resistor 148 of a control voltage which is transmitted by conductor 170 to the control electrode of SCR 102 causing conduction therethrough. The conduction circuit comprises secondary winding 85, conductor 130, conductor 131, motor winding 91, conductor 166, SCR 102, ground terminal 174 and return to secondary winding ground 175. Similarly, a parallel circuit is completed through motor winding 90 and capacitor 92.

The motor rotor 94 may drive an output member through a shaft 35 and gear train 34 for positioning a load device such as a control surface of an aircraft.

From the above it is apparent that for various magnitudes of DC input error signal applied to conductor 21 that the resultant power applied to the windings of motor 32 develops a torque as the result of such signals, so that the ratio of error signal and torque approaches a linear relationship. Thus by means of the above novel arrangement of FIG. 5, the relationship of input volts on conductor 21 relative to the motor torque is as shown in the solid lines of FIG. 4.

We claim:
1. Servomechanism control apparatus, comprising:
   a voltage transmission means connected to a source of alternating voltage, said alternating voltage having a time duration per cycle;
   a first control means providing a cyclic control signal;
   a second control means providing a cyclic control signal, 180° displaced from said first control signal both having a similar duration per cycle as that from the first recited source;
   first means connected to the transmission means receiving said alternating voltage and said first and second control signals and providing an output cyclic voltage of varying positive and negative magnitudes, the cycle of the output voltage being of a time duration less than the time duration of the cycle of the first recited source of alternating voltage;
   a source of control error voltage; and
   a signal combining means receiving said control error voltage and the output cyclic voltage and providing an output of a magnitude dependent on the algebraic sum of the cyclic voltage and the error voltage.

2. The apparatus of claim 1, wherein the first means initially effects a phase shift of the alternating voltage and thereafter modifies such phase shifted alternating voltage in response to the first and second control signals by causing an inversion of alternate half-cycles of the phase shifted alternating voltage to provide the cyclic output voltage so that maximum positive magnitude of the modified alternating voltage or the output voltage appears at the end of one half-cycle and is succeeded by a maximum negative magnitude of voltage of the following half-cycle of the cyclic output voltage.

3. The apparatus of claim 1, and motor means connected to respond to said signal combining means.

4. The apparatus of claim 3, wherein said motor means comprises a motor of the two phase type and said motor is energized in each half-cycle of a full cycle of its power source in accordance with the output of the signal combining means, whereby the torque of the two phase motor approaches linearity with respect to the error signal magnitude.

5. The apparatus of claim 3, wherein the motor means drives part of the control means of a closed loop system and thus tends to reduce the magnitude of the error voltage.

6. The apparatus of claim 1, wherein the first and second sources of control signal are cyclic square waves, whereby the output of each cycle from said first means is similar in shape to a fraction of a cycle of said alternating source.

7. The apparatus of claim 4, wherein each winding of the two phase motor is connected to an alternating source during at least a portion of a half-cycle thereof through a phase control electronic switch, controlled by the signal combining means.

8. The apparatus of claim 1, wherein the output of the signal combining means is of the pulse type, wherein the duration of a pulse varies with the algebraic sum of the control error voltage and the cyclic output voltage of the first means.

9. The apparatus of claim 7, wherein the phase control electronic switch is a silicon controlled rectifier.

10. The apparatus of claim 7, wherein a second phase control electronic switch connects a phase winding of the motor to the alternating power source during another half-cycle of the power source.

11. In motor control apparatus, means receiving an AC line voltage and generating a cyclic nonlinear toggle signal having twice the frequency of the AC line voltage;
   means supplying a DC input signal;
   means combining the toggle signal with the DC input signal;
   a dual level, bidirectional switch;
   means connecting the combining means to the dual level, bidirectional switch to cause on-off operation thereof in accordance with the output of the combining means;
   a set of silicon controlled rectifiers;
   motor means reversibly controlled by the silicon controlled rectifiers; and means controlling the set of silicon controlled rectifiers from the bidirectional switch for energization of said motor means to obtain a near linear relation between the torque developed by the motor means and the DC input signal.